INVENTOR
LLOYD H. JOICHI

BY Olsen and Stephenson
ATTORNEYS

United States Patent Office 3,428,190
Patented Feb. 18, 1969

3,428,190
AUTOMATIC LOAD AND UNLOAD APPARATUS
Lloyd H. Joichi, Warren, Mich., assignor to La Salle Machine Tool, Inc., Warren, Mich., a corporation of Michigan
Filed July 7, 1966, Ser. No. 563,484
U.S. Cl. 214—1     4 Claims
Int. Cl. B65g 57/06, 60/00

ABSTRACT OF THE DISCLOSURE

Automation equipment for automatically moving workpieces between "supply," "unload," and "work" stations comprising a pair of aligned fluid actuated clyinder assemblies, a work holding fixture connected to the cylinder assemblies so that on actuation of the assemblies, the fixture is movable sequentially between the stations, and means on the fixture for moving the workpieces to and from the fixture at the stations.

---

This invention relates generally to apparatus for transferring workpieces to and from a work fixture and more particularly to improved automatic apparatus of this type for loading and unloading a fixture which holds a workpiece during work thereon.

Automation equipment capable of automatically loading workpieces onto a fixture and unloading workpieces from the fixture is desirable in connection with a variety of work situations. It is desirable that such equipment be of machine tool construction, be of a relatively compact size, have positively controlled mechanical movements, provide for unloading of machined workpieces at a location remote from the machining area in which chips are present, and be versatile in its adaptability to different workpieces. It is an object of this invention, therefore, to provide improved work transfer apparatus which incorporates the above desirable characteristics and which can be economically adapted to the handling of various workpieces.

The apparatus of this invention is particularly described herein with respect to its use in transferring annular workpieces from a supply chute to fixture chucks in which the workpieces are held and bored, and subsequently transferring the workpieces from the chucks to unloading chutes. The ends of the supply and unloading chutes and the chucks are arranged in a straight line and a work transfer body is mounted for movement parallel to this line and for in and out movement relative to the chutes and the chucks for picking up and releasing workpieces. The body is moved parallel to the line on which the chute ends and the chucks are arranged by a pair of relatively short stroke cylinder assemblies which are arranged so that one assembly moves the body between the chucks and the unload chutes and the other assembly moves the body between the unload and supply chutes. This enables the use of smaller, more compact cylinder assemblies which can be more accurately controlled and enables positive mechanical movement of the body between its three stop positions. In addition, the chutes and chucks are located so that the body is out of the way during boring of parts in the chucks, and so that the body can be quickly moved to pick up parts from the supply chutes, and remove the machined parts and deliver them to the unloading chutes. It is to be understood, however, that the apparatus of this invention is adaptable to other automatic load and unload situations involving parts other than ones of annular shape.

Further objects, features and advantages of this invention will become apparent from a consideration of the following description, the appended claims, and the accompanying drawing in which:

Figure 1:
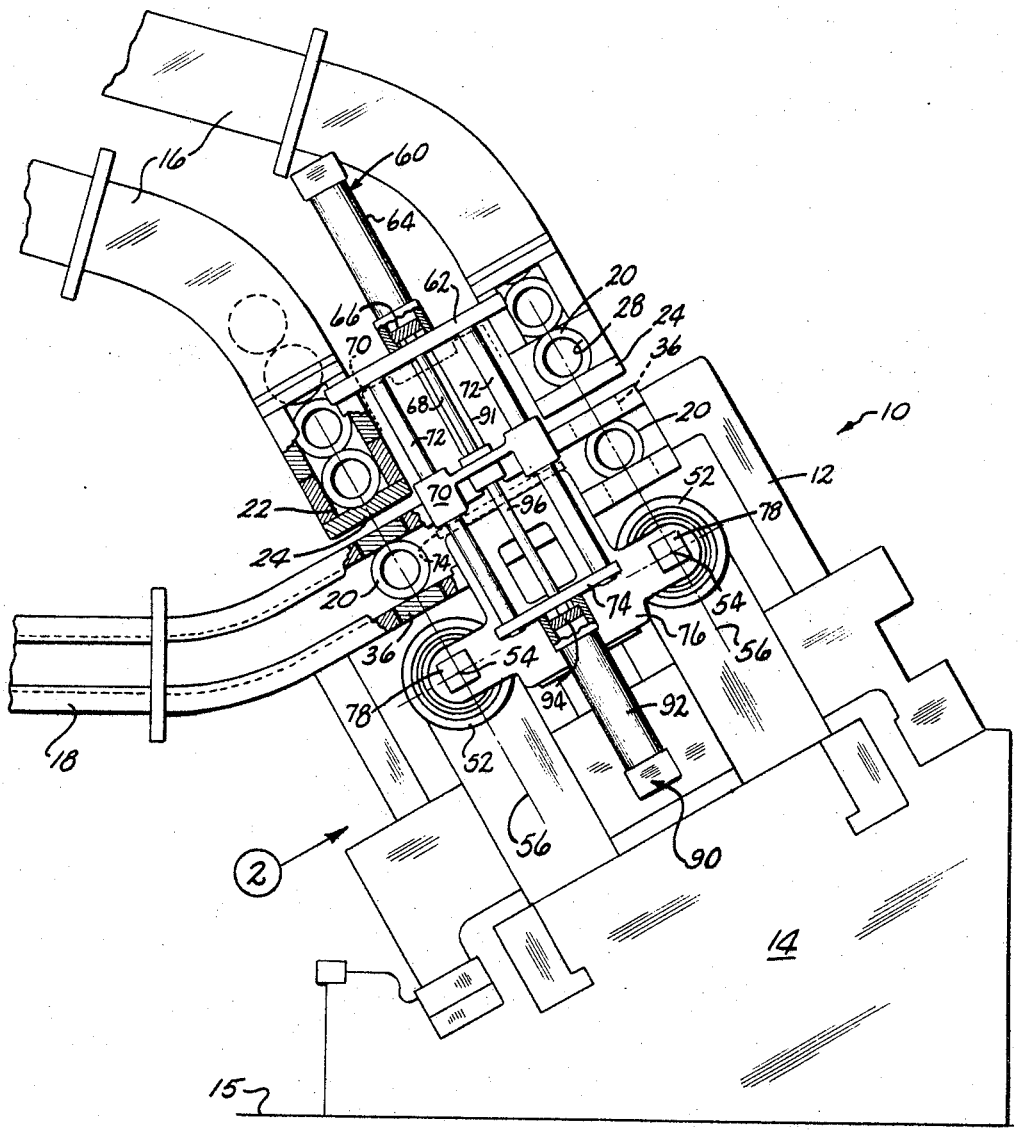
FIGURE 1 is an end view of the transfer apparatus of this invention, with some parts broken away and other parts shown in section for the purpose of clarity.

With reference to the drawing, the transfer apparatus of this invention, indicated generally at 10, is illustrated in FIG. 1, as including a main frame 12 having a base 14 and connected to a pair of workpiece supply chutes 16 arranged in a spaced side-by-side relation inclined with respect to a floor line, indicated at 15. A workpiece discharge chute 18, which is also inclined, is connected to the main frame 12 below the supply chute 16.

Figure 2:
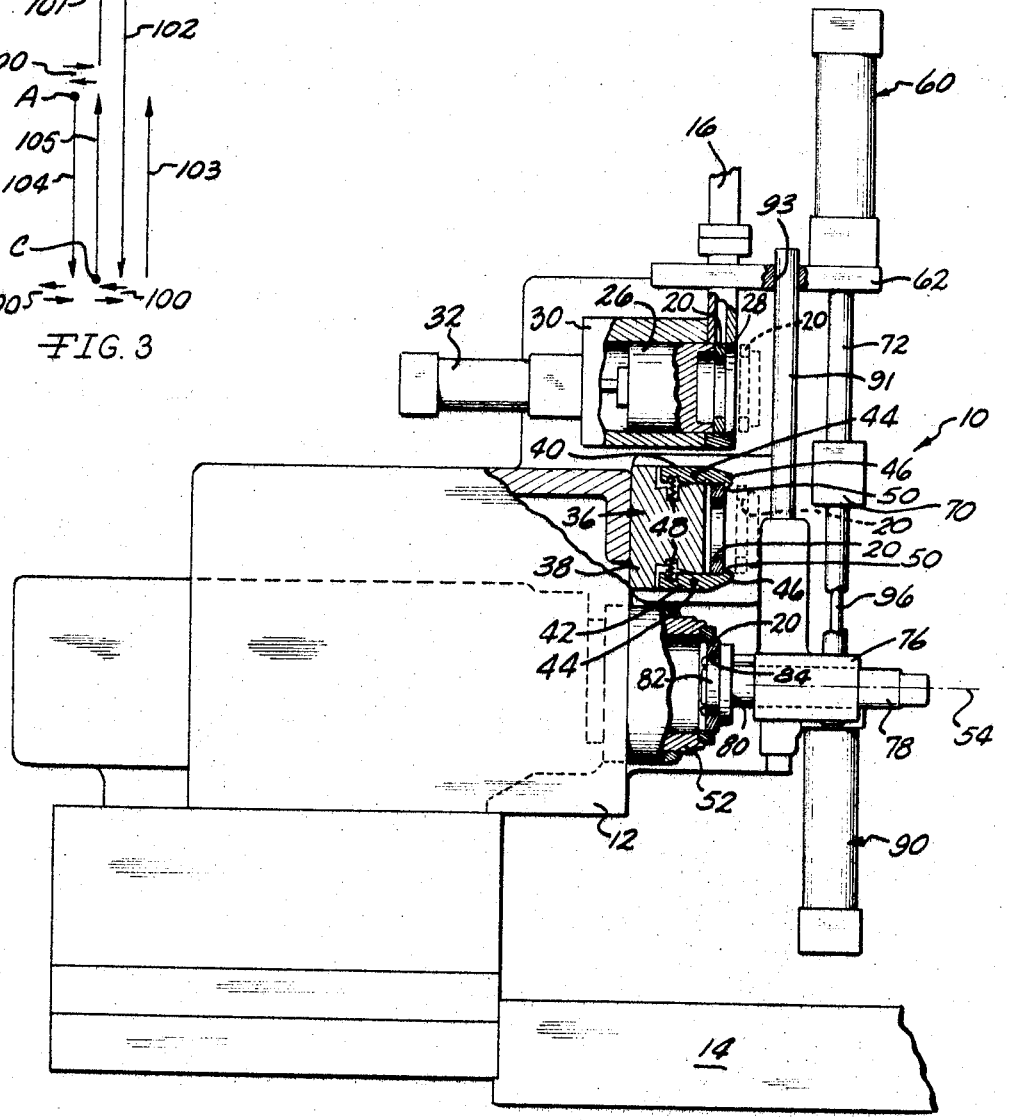
FIGURE 2 is a side elevational view of the apparatus of this invention looking in the direction of the arrow 2 in FIG. 1.

As shown in FIGS. 1 and 2, the apparatus 10 in the illustrated embodiment of the invention is adapted for handling workpieces 20 which are of annular ring shape. The lower outlet ends 22 of the supply chutes 16 have recessed support plates 24 which locate a pair of workpieces 20 at the outlet ends 22 of the chutes 16 in positions in which each workpiece 20 is horizontally aligned with a plunger 26 (FIG. 2) and a discharge opening 28 for the chute which is disposed in a vertical plane. The plunger 26 is slidably mounted in a tubular support 30 which is fixed on the main frame 12 and connected to a fluid actuated cylinder assembly 32 which is operable to move the plunger 26 in a direction to move a workpiece 20 through the opening 28.

The inlet end of the discharge chute 18 is provided with a pair of workpiece removal fixtures 36 disposed so that each one is below and in line with the workpiece 20 on the outlet end plate 24 of a supply chute 16. The fixtures 36 are identical so that only one is described in detail herein. Each fixture 36 includes a body 38 located rearwardly of the chute 18 and a pair of upper and lower fingers 40 and 42 mounted on horizontal pivots 44 carried by the body 38. The fingers 40 and 42 are provided at their outer ends with radially inwardly directed flanges 46, and springs 48 extended between the body 38 and the inner ends of the fingers 40 and 42 urge the flanges 46 toward each other. As shown in FIG. 2, the radially inner edges 50 of the fingers 46 are tapered so that a workpiece 20 can be moved to the left as viewed in FIG. 2 into engagement with the flange edges 50 to urge the fingers 40 and 42 away from each other against the pressure of the springs 48. As soon as the workpiece 20 has been moved inwardly of the fingers 40 and 42 past the flanges 46, the springs 48 return the fingers 40 and 42 to their FIG. 2 positions in which the flanges 46 block reverse movement of the workpiece 20.

A pair of workholding chuck fixtures 52 are disposed below the unload fixtures 36. Each fixture 52 is of conventional construction and is capable of radially inward movement to grip a workpiece 20 therein so that the workpiece 20 is aligned with an axis 54 about which a machine tool (not shown) such as a boring bar is rotatably mounted for machining the workpiece 20. As shown in FIG. 1, two chuck fixtures 52 are provided spaced apart in a horizontally inclined direction. Each of the fixtures 52 is centered with respect to a line 56 which is inclined and extends through the axis of one of the unload fixtures 36 and the axis of a workpiece 20 located in the discharge end of a supply chute 16 and supported on the end plate 24 therefor. Each fixture 52 is therefore sometimes referred to hereinafter as being "in line" with the inlet end of the discharge or unload chute 18 and the outlet end of a supply chute 16. The significance of this "in line" arrangement will become more significant from the description which follows.

The portion of the apparatus 10 which is provided for moving the workpieces 20 between the outlet ends 22 of the supply chutes 16, referred to hereinafter as "supply stations," the work holding fixtures 52, hereinafter sometimes referred to as the "work stations" and the inlet end of the discharge chute 18 at which the fixtures 36 are located, referred to hereinafter as "unload stations," includes a first fluid actuated cylinder assembly 60 mounted on a plate 62 secured to the main frame 12. The cylinder assembly 60 includes a cylinder 64 in which a piston 66 is slidably mounted and attached to a piston rod 68. The lower end of the piston rod is attached to a slide unit 70 which is slidably mounted on a guide frame consisting of a pair of bars 72 which are parallel to the lines 56 and to the piston rod 68. The guide bars 72 are secured at their upper ends to the frame plate 62. The lower ends of the guide bars 72 have a plate 74 slidably mounted thereon, and the plate 74 is rigidly secured to and forms a part of a body 76 on which a pair of short stroke cylinder assemblies 78 are mounted. Each cylinder assembly 78 is connected to a plunger 80 slidably mounted on the body 76 for movement parallel to the axis 54 and perpendicular to the lines 56. Each plunger 80 has a fixture 82 mounted thereon which is capable of holding a workpiece 20 in a position against a flange 84 for a purpose to appear presently.

Another cylinder assembly 90 is attached to the plate 74. The cylinder assembly 90 includes a cylinder 92 in which a piston 94 is slidably mounted and secured to a piston rod 96 which is also attached to the slide unit 70. As shown in FIG. 1, the piston rods 68 and 96 are substantially aligned and are parallel to the lines 56. The stroke of the cylinder assembly 90 is such that when the piston rod 96 is retracted into the cylinder 92, the cylinder 92 and the body 76 are moved upwardly, from the FIG. 1 positions in which the fixtures 82 are horizontally aligned with the fixtures 52, to a position in which the fixtures 82 are horizontally aligned with the unload fixtures 36. In this retracted position of the piston rod 96, the plate 74 is in the broken line position illustrated in FIG. 1. The stroke of the cylinder assembly 60 is such that when the piston rod 68 is subsequently retracted into the cylinder 64, the slide unit 70 is moved upwardly on the guide bars 72 to the broken line position shown in FIG. 1. When the slide unit 70 is moved upwardly, the cylinder 92 and the body 76 are moved upwardly also. In this position of the slide unit 70, the body 76 has been moved upwardly in a direction parallel to the lines 56 to a position in which the fixtures 82 are aligned horizontally with the workpieces 20 on the plates 24 at the discharge ends 22 of the supply chutes 16. During up and down movement, body 76 is guided by a rod 91 secured thereto and extended through a guide opening 93 in plate 62 (FIG. 2), in addition to being guided by bars 72, to assure movement of body 76 parallel to lines 56.

In the operation of the apparatus 10 of this invention, assume that the cylinder assemblies 60 and 90 have been actuated to move the body 76 to a position in which the fixtures 82 are aligned with the unload fixtures 36 so that workpieces 20 removed from the work fixtures 52 are aligned horizontally with the unload fixtures 36, as shown in broken lines in FIG. 2. The work carrying fixtures 82 are now located at the unload station indicated diagrammatically at A in FIG. 3. The cylinder assemblies 78 are operated to move the work fixtures 82 inwardly of the unload fixtures 36 to position the workpieces 20 on the fixtures 82 in the position shown in solid lines in FIG. 2. The cylinder assemblies 78 are then reversely actuated to withdraw the work holding fixtures 82, the fingers 40 and 42 removing the workpieces therefrom so that the workpieces 20 are then free to roll downwardly in the discharge chute 18. This in and out movement of fixture 82 is illustrated by the arrows 100 in FIG. 3.

Figure 3:
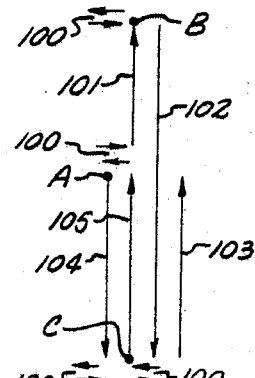
FIGURE 3 is a line diagram illustrating the sequence of operation of the apparatus of this invention.

The cylinder assembly 60 is then actuated to move the body 76 upwardly along the line indicated at 101 in FIG. 3 to a position in which the work holding fixtures 82 are aligned with the workpieces 20 at the discharge ends of the chute 16, so that the work holding fixtures 82 are now in positions aligned with the load or supply station indicated diagrammatically at B in FIG. 3. The cylinder assemblies 78 are then actuated to move the fixtures 82 horizontally to positions in which the plungers 26 can be actuated by the cylinder assemblies 32 to move the workpieces 20 out of the chutes 16 and onto the fixtures 82. The fixtures 82 are then returned by the cylinder assemblies 78.

The cylinder assemblies 60 and 90 are then actuated to extend the piston rods 68 and 96, respectively, so as to move the body 76 downwardly along a line indicated at 102 in FIG. 3 parallel to the lines 56 to a position in which the work holding fixtures 82, which at this time are carrying a pair of workpieces 20, in horizontal alignment with the chuck fixtures 52. The fixtures 82 are now horizontally aligned with work stations indicated at C in FIG. 3. The cylinder assemblies 78 are actuated to move the work holding fixtures 82 inwardly relative to the chuck fixtures 52 which are then conventionally actuated to grip and hold the workpieces 20. The work holding fixtures 82 are then withdrawn by the cylinder assemblies 78 and the cylinder assembly 90 is actuated to retract the piston rod 96 and move the body 76 upwardly along the line indicated at 103 in FIG. 3 to a position in which the work holding fixtures 82 are horizontally aligned with the unload fixtures 36. At this time, the work holding fixtures 82 are empty.

The body 76 then dwells in this position for a predetermined time period sufficient to enable machine tools (not shown) rotatable about the axes 54 to move inwardly relative to the chuck fixtures 52 and machine the workpieces 20 thereon. During this machining operation, the body 76 is out of the way so as not to interfere in the machining operation.

At the expiration of the predetermined dwell period, cylinder assembly 90 is actuated to extend the piston rod 96 so as to move the body 76 downwardly, as indicated diagrammatically by the line 104 in FIG. 3, and return it to the work station C. The cylinder assemblies 78 are now actuated to move the work holding fixtures 82 into the chuck fixtures 52 which are then released, so that when the cylinder assemblies 78 are reversely actuated, the machined workpieces 20 are carried on the work holding fixtures 82. The cylinder assembly 90 is then actuated to retract the piston rod 96 and move the body 76 upwardly, as indicated diagrammatically by the line 105 in FIG. 3 to align the machined workpieces 20 with the unload fixtures 36. The above described sequence is then continuously repeated to provide for the continuous and automatic transfer of workpieces 20 to and from the work stations C.

From the above description, it is seen that this invention provides transfer apparatus 10 in which two relatively short stroke cylinder asemblies 60 and 90 are utilized to move workpieces 20 between the supply station B, the unload station A, and the work station C in a predetermined cycle. This assembly of the cylinder assemblies 60 and 90 makes it possible to avoid the use of larger more expensive cylinders which cannot be easily accurately moved over longer distances. In addition, the arrangement of the stations A, B and C relative to the cylinder assemblies 60 and 90 enables the apparatus 10 to be automatically moved through the sequence described above, and the location of the unload station A remote from the work station C avoids the undesirable accumulation of chips from the machining operation on the finished workpieces 20. Also, this arrangement enables the stations to be arranged in pairs so that gravity can be utilized to move the workpieces to the supply station B and from the unload station A.

It will be understood that the automatic load and unload apparatus which is herein disclosed and described is presented for purposes of explanation and illustration and is not intended to indicate limits of the invention, the scope of which is defined by the following claims.

What is claimed is:

1. Transfer apparatus comprising a first fluid actuated cylinder assembly having a fixed position cylinder and a piston rod adapted to be retracted and extended relative to said cylinder, a second fluid actuated cylinder assembly having a cylinder and a piston rod adapted to be retracted and extended relative thereto, work holding means attached to said second cylinder, said second piston rod being in substantial alignment with said first piston rod, means connecting said piston rods so that on retraction of said second piston rod into the cylinder therefor said second cylinder and said work holding means are moved toward said first cylinder and so that upon retraction of said first piston rod into said first cylinder, said second cylinder and said work holding means are moved further toward said first cylinder, means providing workpiece supply, unload and work stations disposed in a line substantially parallel to said piston rods and to one side thereof, said stations being in substantial alignment with said work holding means in positions thereof in which both said piston rods are extended, only said first piston rod is extended, and both said piston rods are retracted, and means connected to said work holding means for moving said holding means substantially perpendicular to said piston rods toward and away from said stations.

2. Transfer apparatus according to claim 1 further including a main frame to which said first cylinder is secured and in which said supply station is the outlet end of a supply chute, said unload station is the inlet end of a discharge chute and said work station is a workpiece holding unit.

3. Transfer apparatus according to claim 2 in which said second cylinder assembly has a predetermined stroke corresponding to the distance between said workpiece holding unit and said inlet end of the discharge chute and said first cylinder assembly has a predetermined stroke corresponding to the distance between said inlet end of the discharge chute and said outlet end of said supply chute.

4. Apparatus according to claim 1 further including a main frame, means associated with said main frame for supplying workpieces to a predetermined supply station, means on said main frame defining an unload station for workpieces disposed below said supply station, means on said main frame below and along a straight line extending through said supply and unload stations for holding a workpiece in a fixed position during the performance of work thereon, said straight line being substantially parallel to said piston rods, and a guide frame on said main frame substantially parallel to and to one side of said line, said guide frame guidably supporting said work holding means for movement along a path substantially parallel to said line.

References Cited
UNITED STATES PATENTS 2,934,218   4/1960   Peras _____ 214—1

FOREIGN PATENTS 964,411   7/1964   Great Britain.

GERALD M. FORLENZA, *Primary Examiner.*

G. F. ABRAHAM, *Assistant Examiner.*